United States Patent [19]

Bair

[11] 3,842,852

[45] Oct. 22, 1974

[54] DISASTER VALVE

[76] Inventor: Clyde F. Bair, 408 E. 46th St., Long Beach, Calif. 90807

[22] Filed: Feb. 28, 1973

[21] Appl. No.: 336,626

[52] U.S. Cl. .................... 137/39, 251/214, 251/239
[51] Int. Cl. ........................................... F16k 17/36
[58] Field of Search .......... 137/38, 39, 45; 251/239, 251/214; 277/205

[56] References Cited
UNITED STATES PATENTS

| | | | |
|---|---|---|---|
| 1,363,565 | 12/1920 | Christenson | 277/205 |
| 1,508,070 | 9/1924 | Rosen | 251/239 X |
| 1,966,562 | 7/1934 | Roach | 251/239 X |
| 2,454,621 | 11/1948 | Allen | 251/239 X |
| 2,475,967 | 7/1949 | Jeske | 277/205 |
| 2,853,089 | 9/1958 | Bair | 137/39 |

Primary Examiner—Robert G. Nilson
Attorney, Agent, or Firm—Fulwider, Patton, Rieber, Lee & Utecht

[57] ABSTRACT

In an acceleration responsive disaster valve having a weighted collapsible column operatively interposed between the valve stem of a spring loaded valve and a yoke extending from the valve housing, the column compressing the valve stem to render the valve open, the improvement including an intermediate member adapted to be mounted at one end in any desired attitude with respect to the valve housing and adapted to connect to the yoke at the other end, a rocker pivotally mounted from said intermediate member having one end disposed in abutting relationship with said valve stem and the other end abutting a follower slidably restrained in the other end of said member, said weighted column being interposed between said yoke and said follower. To insure free axial motion of the valve a cup seal is disposed around the valve stem for maintaining a seal thereat. Furthermore the cooperating surfaces of the valve are tapered to center the valve should it be laterally displaced during closure within the tolerances in the valve housing.

4 Claims, 3 Drawing Figures

PATENTED OCT 22 1974  3,842,852

3,842,852

DISASTER VALVE

BACKGROUND OF THE INVENTION

1. Field of the Invention

The present invention relates to environment responsive shut-off valves, and more particularly to shut-off valves disposed to close upon the occurence of environmental disasters such as earthquake or fire. While the invention is of general utility, it is particularly suitable for use with, and will be described in connection with, the apparatus of the type shown and described in the patent to Clyde F. Bair, U.S. Pat. No. 2,853,089.

2. Description of the Prior Art

In many applications of both commercial and noncommercial use it is often required that a supply of hazardous fluids, such as natural gas or liquid propane, be permanently connected to various operating devices. Specifically such connections are often made by conductors extending over long runs, making continuous monitoring thereof impractical. The particular hazard most frequently considered is the hazard of a line break during a catastrophic occurence such as an earthquake or fire where the dangerous fluids contained in the conduit will vent to the atmosphere or will spill over, either to ignite or to provide a dangerous environment to humans. When such line breaks occur during phenomena like earthquake or fire the associated disorder precludes an effective manual correction and many shut-off valves have been developed in the past directly responsive to both phenomena to prevent the escape of such fluids during the disaster. One particular shut-off valve of this kind has been disclosed in the aforementioned patent, including a spring loaded valve held in open position by a weighted collapsible column disposed between the valve stem and a yoke. The column forms a compressive structure easily upset by lateral shocks thus providing an assembly responsive to earthquakes, while the yoke further includes structural fusible elements which are easily melted in the case of fire. Since it is specifically intended that the column be responsive to lateral loads it has been the practice in the past to align the column and the valve essentially in a vertical direction such that the weight of the column is passed directly to the valve stem and no lateral load due to gravity is applied thereto in its normal position. Accordingly in all such applications it has been necessary to align the valve in a substantially vertical direction with respect to the surface of the earth. In many applications such vertical alignment of the valve is not always possible since horizontal sections of a conduit may either provide too much shock isolation or are too far from a potential source of fire and extensive conduit routing had to be included in order to facilitate this alignment.

A further feature of devices of this kind is that any restraint on the axial motion of the valve stem would defeat the automatic functioning thereof and leakage around the valve stem often presented a critical constraint on the design of the valve. In addition the displacement of the column off the valve stem during the release transient would also affect the closure thereof requiring close tolerances in the valve guide in order to keep the valve centered during closure. Such close tolerances often produced further restraints on the axial release motion of the valve, particularly if corrosion of the cooperating surfaces is possible.

SUMMARY OF THE DISCLOSURE

Accordingly it is the general purpose and object of the present invention to provide a disaster valve assembly which can be mounted on a conduit aligned in any direction and which furthermore provides a substantially constant axial restraint on the valve stem due to the seals thereof. Other objects of the invention are to provide valve surfaces which are essentially self centering, thus allowing for large lateral loading of the valve stem during valve closure, and to provide a valve stem seal which is limited in compression and therefore is limited in the axial restraint it places on the motion of the valve stem.

Briefly these and other objects are accomplished according to the present invention by providing an arcuate intermediate member between the valve housing and the yoke assembly having a first mounting ring at one end thereof adapted to surround the valve neck in coaxial relationship with the valve stem and having a second mounting ring at the other end thereof defining a central axis coplanar and at an angle with respect to the central axis of the valve stem. Pivoted between the respective mounting rings from the inner surface of the intermediate member is a rocker plate terminating with two camming surfaces on either end thereof. The pivotal motion of the rocker plate is aligned coplanar with the central axes of the first and second mounting ring thereby placing one camming surface in abutting relationship with the end of the valve stem. The second mounting ring includes a cam follower disposed in alignment with the central axis thereof to abut the other camming surface. Also received in the second mounting ring and on the exterior of the intermediate member is a yoke structure including a weighted column compressed between the extreme element of the yoke and the other end of the follower. In order to accommodate the lateral loads during actuation the valve stem is passed through a valve guide in the valve housing which includes on the outer side thereof a cup seal compressed to a predetermined level of compression by a retainer. The closing action is further centered by a conical valve disposed around the valve stem, where the valve engages with a conical valve seat, such valve and valve seat cooperating to center the valve during closure, thus accommodating the tolerances of manufacture of the valve guide. In this manner an improved disaster valve assembly is formed which is both adaptable to be mounted on any valve alignment and which is further self centering in its operation and self sealing at the valve stem by virtue of the cup seal disposed thereat.

DESCRIPTION OF THE PREFERRED EMBODIMENT

Figure 1:
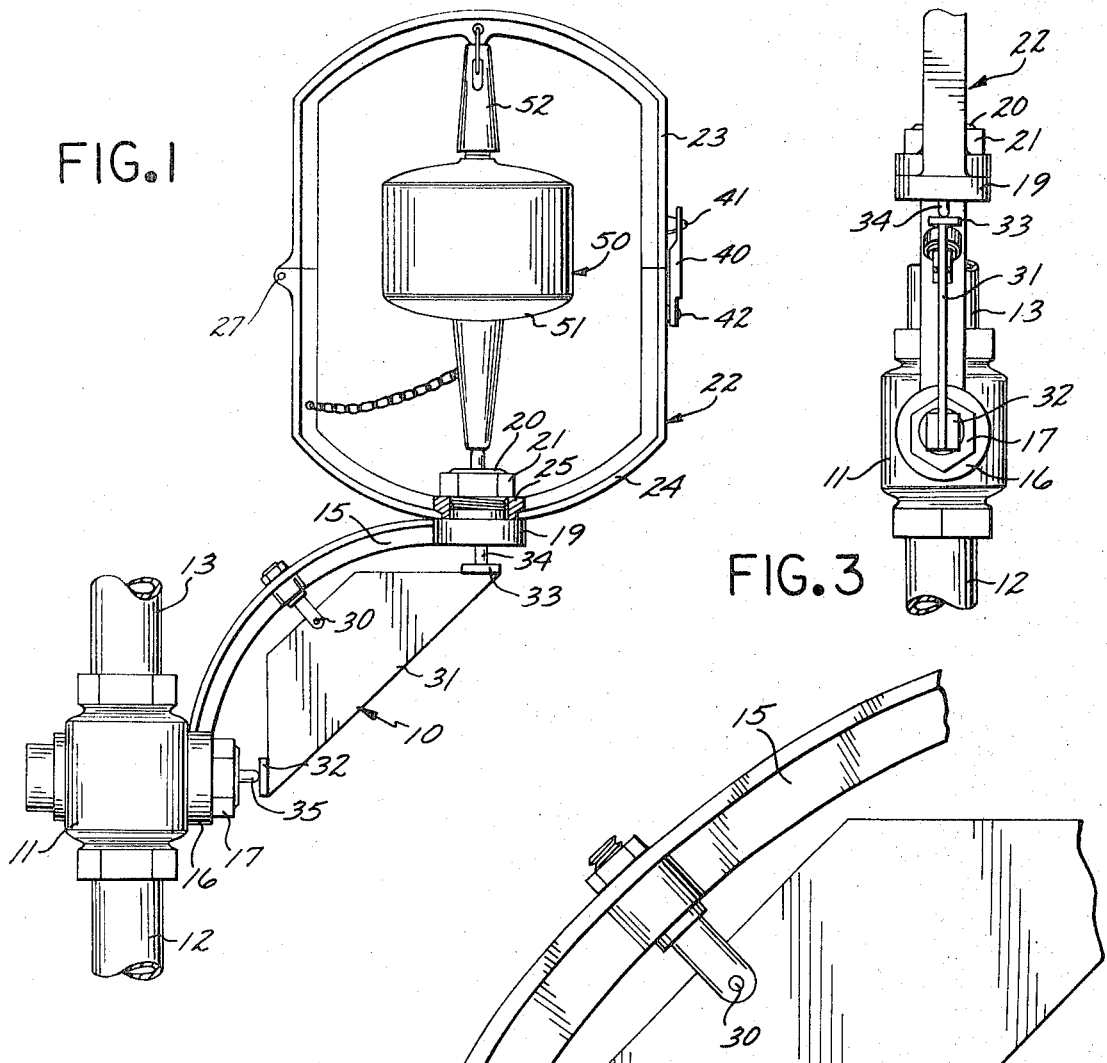
FIG. 1 is a side view of a disaster valve constructed according to the present invention.
Figure 3:
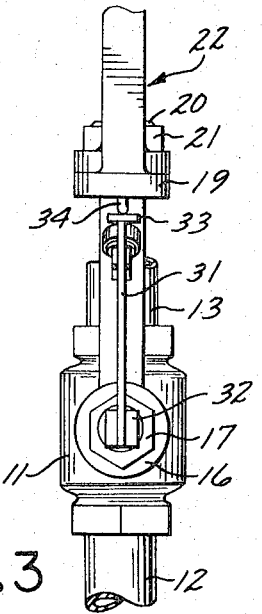
FIG. 3 is a front view of the disaster valve shown in FIG. 1.

As shown in FIG. 1 a disaster valve generally designated 10 includes a spring loaded shut-off valve 11 connected in line between two adjacent conduit sections 12 and 13. An intermediate mounting member 15 terminating at one end in a mounting ring 16 is attached to valve 11 by the ring 16 disposed around the neck of valve 11 being secured thereat by compressing said ring against the valve by a compression nut 17. In this manner any selected orientation of member 15 relative the central axis of the valve 11 can be made by securing the ring 16 to valve 11. The mounting member 15, furthermore, defines a generally arcuate structure extending radially along an arc from the plane of ring 16 in a direction away from the central axis of the valve, terminating at the other end in a mounting fitting 19. A yoke assembly generally designated 22 is composed of upper and lower yoke halves 23 and 24 respectively, the lower yoke half 24 being provided with a ring 25 formed to receive a reduced diameter projection 20 extending outwardly from fitting 19 along an axis normal to the local tangent at the member 15, said ring 25 being secured to fitting 19 by a nut 21 threadably engaging the distal end of projection 20.

Rings 16 and 25 both provide smooth interior surfaces thereby allowing for rotation thereof around the cooperating structures, being respectively secured in any desired orientation by the compressing of nuts 21 and 17. Disposed intermediate the distal ends of member 15 and extending towards the interior of the arc formed thereby is a pivot 30 having pivotally attached thereto a rocker plate 31. Rocker plate 31 is centrally secured to pivot 30 terminating at one free end in a first camming surface 32 disposed to abut in a substantially normal relationship the exposed end of a valve stem 35 protruding for axial motion from valve 11. At the other end of rocker plate 31 a second camming surface 33 is formed abutting a cam follower 34 extending through a central opening 21 formed in fitting 19 and projection 20 to the interior of the yoke 22.

The two yoke halves 23 and 24 are hinged in common at adjacent one ends thereof by a hinge pin 27 extending therethrough. On the other ends the yoke halves 23 and 24 are held together by a temperature sensitive fusible link 40, said link being bolted to two lateral projections 41 and 42 on the respective yoke halves 23 and 24. Fusible links of this type are well known in the art and are chosen to melt at any predetermined temperature of the surrounding atmosphere. Disposed between the other end of follower 34 and the extreme member of the yoke half 23, and aligned axially with the follower, is a weighted column 50 comprising a lower weighted member 51 and an upper member 52. As described in the aforementioned patent the upper member 52 cooperates with the lower weighted member 51 through a hemispherical connection (not shown) which has a limited stability in bending such that any lateral shock or acceleration of the weighted element 51 will tend to collapse the column 50, thereby releasing cam follower 34 and releasing valve stem 35 through the pivoting motion of the plate 31. Furthermore, an increase in temperature above the melting temperature of the fusible link 40 will permit the respective two halves of yoke 22 to separate and thereby release, in a similar manner, valve stem 35.

Figure 2:
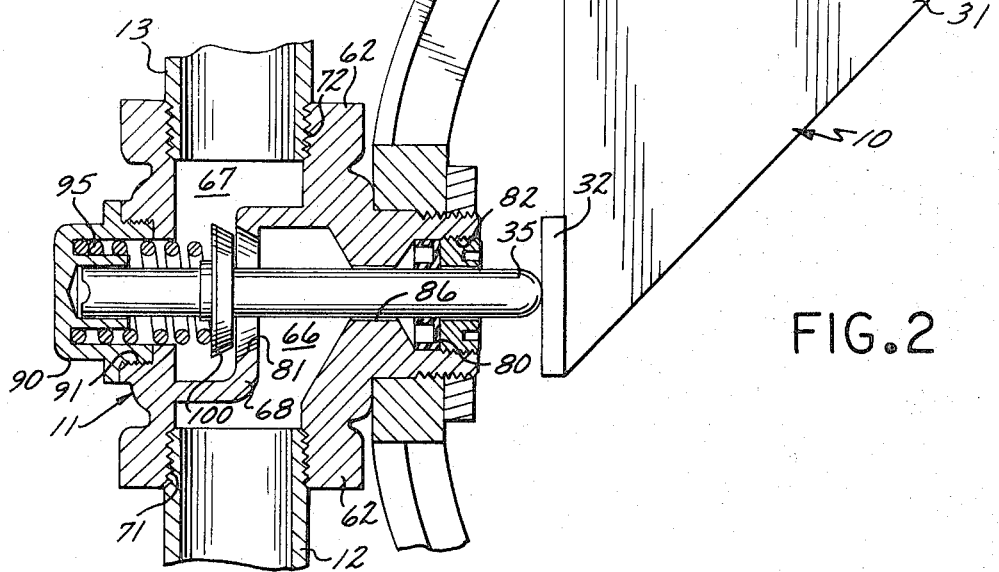
FIG. 2 is a partial cross-sectional view of FIG. 1.

As shown in FIG. 2 valve 11 comprises a housing 62 including an upper chamber 66 and a lower chamber 67 formed on either side of a common separating wall 68. Chamber 66 communicates through a threaded port 71 with the pipe section 12, while chamber 67 communicates through a threaded port 72 with pipe section 13. A circular valve seat 81, formed concentric with the central axis of the valve stem 35, provides for communication between the respective chambers, the valve stem 35 being retained in this alignment by a valve guide 86 formed in the outer wall of chamber 66. On the other side of valve guide 86 the valve stem 35 is received in an annular cup seal 80 disposed with the open end thereof directed towards the interior of valve 11 and compressed into sealing position by a threaded retainer 82 receivable in surrounding relationship around stem 35 in housing 62 to be threaded until abutting against a retainer stop surface 83 formed therein. In this manner the valve stem is maintained in alignment within valve guide 86 and leakage thereacross is sealed off by the self actuating operation of the cup seal 80. At the other end valve stem 35 is receivable in a spring retainer 90 threadably engaged in a threaded port 91 formed in housing 62 on the distally opposing wall of chamber 67 in concentric relationship with valve guide 86. Spring retainer 90 further includes an annular valve guide 91 formed therein for supporting the other end of stem 35, said annular valve guide forming a seat for, on the exterior thereof, a helical compression spring 95. Thus spring 95 extends from the interspace between valve guide 93 and the outer shell of retainer 90, extending upwardly around valve stem 35 to abut against the bottom surface of a conical valve 100 formed around valve stem 35 below the valve seat 81. The outer surfaces or the periphery of the conical valve 100 and the inner surface of valve seat 81 are formed along a taper converging towards the exposed end of stem 35, said conical valve and valve seat cooperating to center the valve during closure. Accordingly a release of the compression developed by the column 50 on the follower 34 is translated into a release of valve stem 35 which is then urged upwardly by the spring 90 to close valve 100 against the seat 81. Any lateral dynamic transients associated with this release are taken out in the conical mating of the valve with the seat.

In operation either a thermal exposure of sufficient temperature and heat to melt the fusible link 40 or a lateral shock collapsing column 50 both will release the restraint on the end of follower 34. Follower 34 is then free to move upwardly towards the interior of yoke 22 releasing the rocker plate 31 to allow valve stem 35 to travel axially in outwardly from valve 11. In order to preclude orientations in which column 50 is exposed to lateral gravitational forces in a steady state environment the alignment of the member 15 with respect to valve 11 through ring 16 permits selective alignment simply by compressing nut 17, and the orientation of the valve 11 on the respective pipe sections 12 and 13 allows for the other degree of freedom to accommodate any orientations of the conduit. A predictable axial freedom of motion of valve stem 35 during the closing transient is further assured by the self-centering action of the valve, thus accommodating relatively loose tolerances in the valve guide, and the cup seal providing a relatively fixed seal restraint while assuring full sealing by the self actuating features thereof.

Some of the many advantages of the present invention can now be readily apparent. The invention provides a shock and fire responsive valve which will not be disabled by torquing of the stem seal retainer. The invention, furthermore, can be mounted on a conduit aligned in any direction thus providing convenient installation along any section thereof.

Obviously, many modifications and variations of the present invention may be made with regard to the foregoing detailed description without departing from the spirit of the invention.

I claim:

1. In a disaster valve assembly including a spring loaded shut-off valve having an axially movable valve stem maintained in the open position by a yoke assembly comprising a yoke operatively connected to the valve housing, a weighted collapsible column operatively disposed between an extreme member of said yoke at one end thereof and adapted to compress at the other end thereof the valve stem, and fusible structural connections included in said yoke, the improvement comprising:
   an arcuate intermediate member adapted to extend from said valve along any one selected azimuth relative the central axis of said valve stem and adapted to connect to said yoke at the other end thereof;
   a rocker plate centrally disposed to pivot from the interior of the arc of said arcuate member abutting at one end thereof said valve stem; and
   a follower slidably disposed in the other end of said member abutting the other end of said rocker at one end thereof and extending to the interior of said yoke to be compressed against said column at the other end thereof.

2. Apparatus according to claim 1, further including:
   an annular cup seal disposed around said valve stem open towards the interior of said valve; and
   compression means for compressing said cup seal in said valve housing to a predetermined level of compression.

3. Apparatus according to claim 2 wherein:
   said valve housing including two chambers disposed across a common wall, a circular valve seat formed in said common wall for communicating between said chambers, and a circular valve concentrically disposed on said valve stem urged by spring means against said valve seat.

4. Apparatus according to claim 3, wherein:
   said circular valve seat and said circular valve forming cooperating mating surfaces tapered along a cone converging in a direction along said valve stem.

* * * * *